United States Patent [19]
Nakayama et al.

[11] Patent Number: 5,574,523
[45] Date of Patent: Nov. 12, 1996

[54] CAMERA CAPABLE OF VARYING SIZE OF IMAGE PLANE

[75] Inventors: Hiroki Nakayama; Hideo Taka, both of Kanagawa-ken, Japan

[73] Assignee: Canon Kabushiki Kaisha, Tokyo, Japan

[21] Appl. No.: 443,686

[22] Filed: May 18, 1995

Related U.S. Application Data

[63] Continuation of Ser. No. 300,852, Sep. 6, 1994, abandoned, which is a continuation of Ser. No. 963,730, Oct. 20, 1992, abandoned.

[30] Foreign Application Priority Data

Oct. 23, 1991 [JP] Japan ................................. 3-305284
Apr. 14, 1992 [JP] Japan ................................. 4-094172

[51] Int. Cl.⁶ .................................................. G03B 17/02
[52] U.S. Cl. ........................... 396/435; 396/133; 396/89
[58] Field of Search ............................. 354/159, 94, 400, 354/195.12, 286, 195.1

[56] References Cited

U.S. PATENT DOCUMENTS

| | | | |
|---|---|---|---|
| 4,165,163 | 8/1979 | Lemanski | 354/159 |
| 4,751,539 | 6/1988 | Yamada et al. | 354/222 |
| 4,770,508 | 9/1988 | Yamada et al. | 350/422 |
| 4,830,474 | 5/1989 | Nakayama et al. | 350/422 |
| 4,871,238 | 10/1989 | Sato et al. | 350/422 |
| 4,909,614 | 3/1990 | Itoh et al. | 350/423 |
| 4,941,070 | 7/1990 | Ogawa et al. | 362/3 |
| 5,008,697 | 4/1991 | Noble | 354/76 |
| 5,010,357 | 4/1991 | Misawa | 354/159 |
| 5,111,223 | 5/1992 | Omura | 354/159 X |
| 5,392,082 | 2/1995 | Ikemori et al. | 354/195.12 |

FOREIGN PATENT DOCUMENTS 57-201213  12/1982  Japan .

*Primary Examiner*—Howard B. Blankenship
*Attorney, Agent, or Firm*—Fitzpatrick, Cella, Harper & Scinto

[57] ABSTRACT

In a camera of the kind arranged to obtain an object image through a photo-taking lens at an arbitrary image plane size on a photosensitive surface by using an image plane size varying member, either the nearest shootable distance of the photo-taking lens is arranged to become shorter than the normally nearest shootable distance or the magnification varying range of the power varying part of the photo-taking lens is arranged to be expanded on the wide-angle side, as the diagonal length of the image plane size becomes shorter.

8 Claims, 9 Drawing Sheets

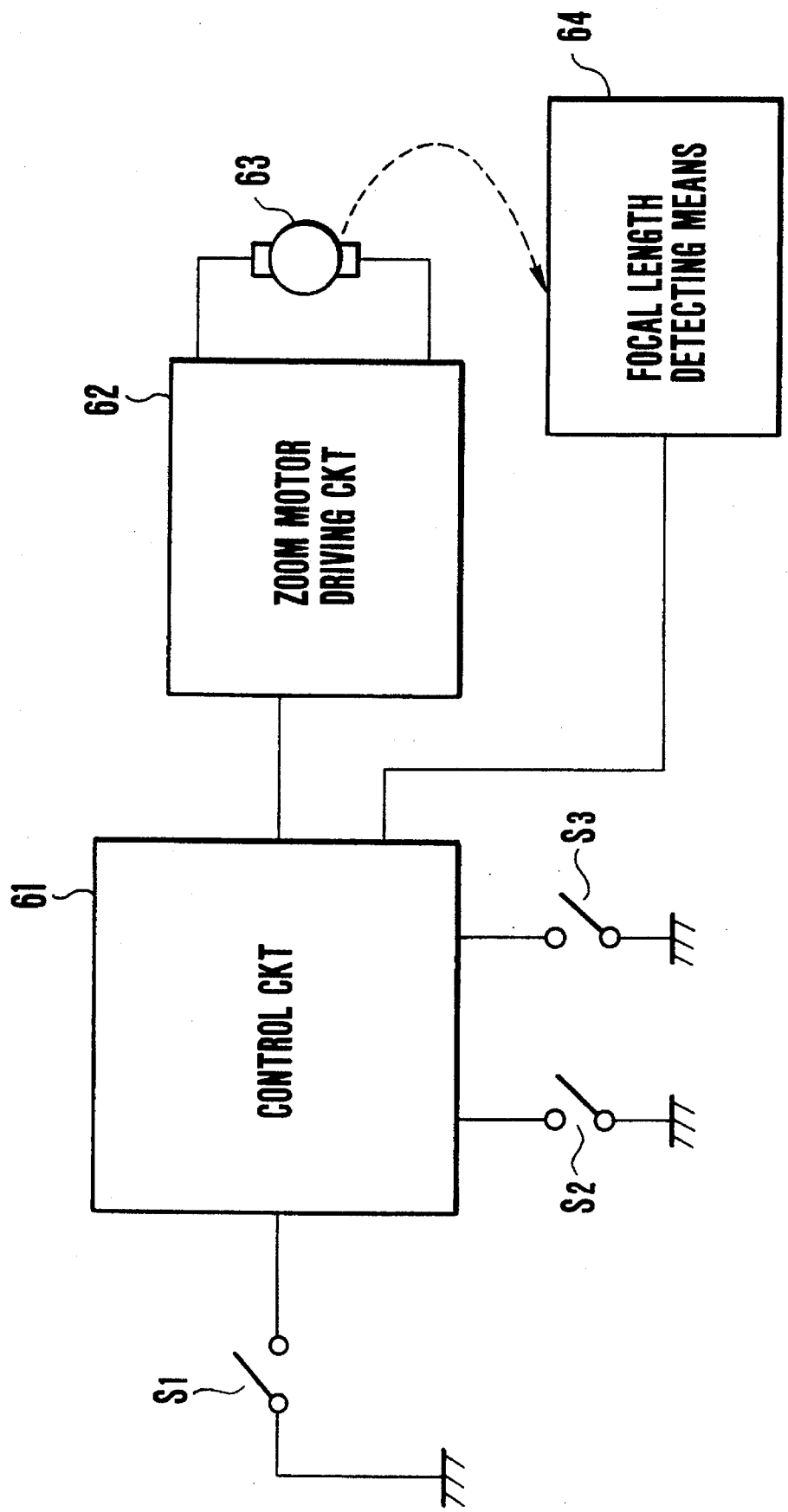

CAMERA CAPABLE OF VARYING SIZE OF IMAGE PLANE

This application is a continuation of prior application Ser. No. 08/300,852 filed on Sep. 6, 1994, which is a continuation of application Ser. No. 07/963,730 filed on Oct. 20, 1992, both now abandoned.

BACKGROUND OF THE INVENTION

1. Field of the Invention

This invention relates to a camera having means for varying the image plane size thereof and, more particularly, to a camera such as a 35 mm film camera, a video camera or the like arranged to be capable of taking shots with the size of its image plane varied through optical or electrical means to attain a spurious power varying effect, a panoramic shot effect, an effect of change-over from a full size to a half size, etc., and also to enhance photo-taking lens specifications.

2. Description of the Related Art

Some of the known 35 mm film cameras or video cameras have heretofore been provided with image plane size varying means for variously changing the image plane size through optical means, mechanical or electrical means in taking shots.

Some 35 mm film cameras, for example, have been arranged to be of the following types:

(a) A type arranged to attain an image plane size change-over effect by moving light-shielding members to partly cover the aperture of an exposure-range-defining mask on the left and right sides of the aperture in such a way as to change the image plane from a full size (36 mm×24 mm) over to a vertically oblong half size (17 mm×24 mm) and vice versa.

(b) A type arranged to attain a panorama effect by moving light-shielding members to partly cover the aperture of the mask in the vertical directions of the aperture in such a way as to change the image plane from the full size over to a laterally oblong panorama size.

(c) Another type arranged to attain a spurious power varying effect by changing (reducing) the image plane size in an analog manner with an aperture-diameter-varying member disposed in front of the film surface.

These cameras of the kind having the image plane size varying means are arranged to simply change the effective aperture of the mask according to the picture taking conditions by using a full size film.

Meanwhile, photo-taking lenses for use in the 35 mm film cameras or video cameras are arranged to perform a focusing action by moving either a part of or the whole of the lens along an optical axis as a shooting distance (object distance) changes. At that time, if the object distance is shorter than the nearest shootable object distance set at the time of designing, a luminous flux that would otherwise be incident on the peripheral part of the image plane is completely eclipsed by the aperture diaphragm or the edge of the photo-taking lens to hinder shooting.

In other words, the nearest shootable object distance of the camera is generally restricted by the size of the whole lens system, the size of the frontmost lens diameter or the aperture diameter of the lens.

In a case where a zoom lens is employed as the photo-taking lens, when a luminous flux otherwise would be incident on the peripheral part of the image plane with the lens in a certain zoom position on the wide-angle side of the lens, the luminous flux might be completely eclipsed by the restriction of the effective diameter of the lens. The zoom position on the wide-angle side (a wide-angle end) of the lens is thus determined partly by the restriction of the effective diameter of the lens. This tendency is salient particularly in a case where a photo-taking lens having a power varying part is used for a lens-shutter type camera.

SUMMARY OF THE INVENTION

It is a first object of this invention to lessen optical restrictions which are imposed on the optical specifications for the photo-taking lens of a camera to hinder changes in the specifications, in attaining various special shooting effects by varying the image plane size on a photosensitive surface, such as a reduction in the nearest object distance and a further increase in the shooting angle of view (for an ultra-wide angle) on the wide-angle side of the lens, if the lens is a zoom lens.

It is a second object of this invention to provide a camera having image plane size varying means which is arranged to lessen the optical restrictions.

It is a third object of the invention to provide a camera having image plane size varying means which is arranged to be capable of obtaining an object image at a desired image plane size on a photosensitive surface through a photo-taking lens, wherein the photo-taking lens is arranged to make its nearest shootable distance shorter when the diagonal length of the image plane is short than when the diagonal length is long.

It is a fourth object of the invention to provide a camera having image plane size varying means which is arranged to be capable of obtaining an object image at a desired image plane size on a photosensitive surface by a photo-taking lens which has a power varying part, wherein the power varying range of the power varying part is arranged to be further expandable on a wide-angle side when the diagonal length of the image plane is short than when the diagonal length is long.

These and further objects and features of the invention will become apparent from the following detailed description of embodiments thereof taken in conjunction with the accompanying drawings.

BRIEF DESCRIPTION OF THE DRAWINGS

FIG. 6 is a block diagram showing the system arrangement of the second embodiment of the invention.

DETAILED DESCRIPTION OF THE PREFERRED EMBODIMENTS

Figure 1A:
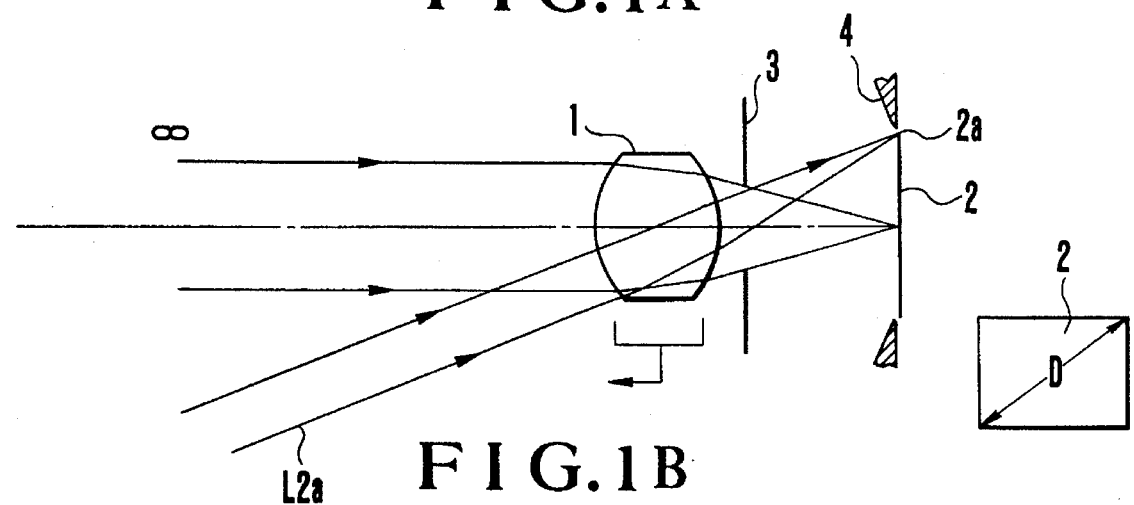
FIGS. 1A, 1B and 1C are sectional views showing the optical system of a first embodiment of the invention.
Figure 1B:
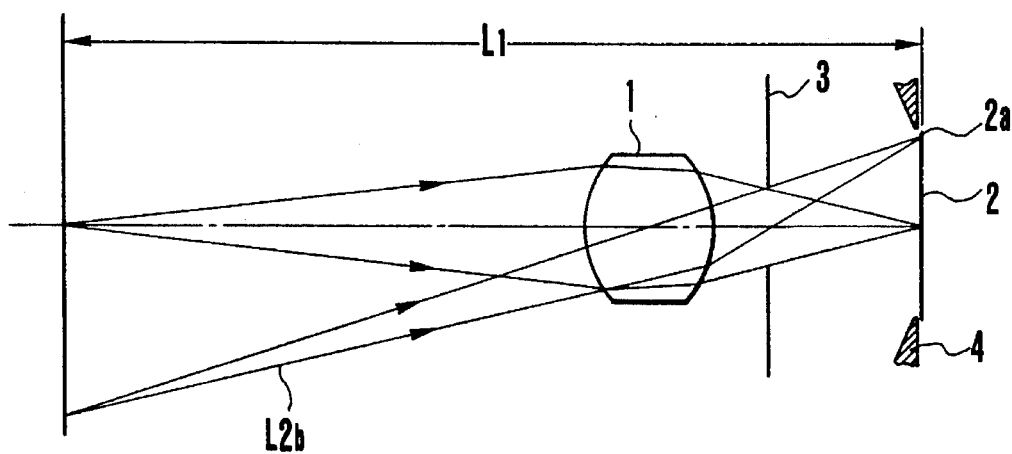
Figure 1C:
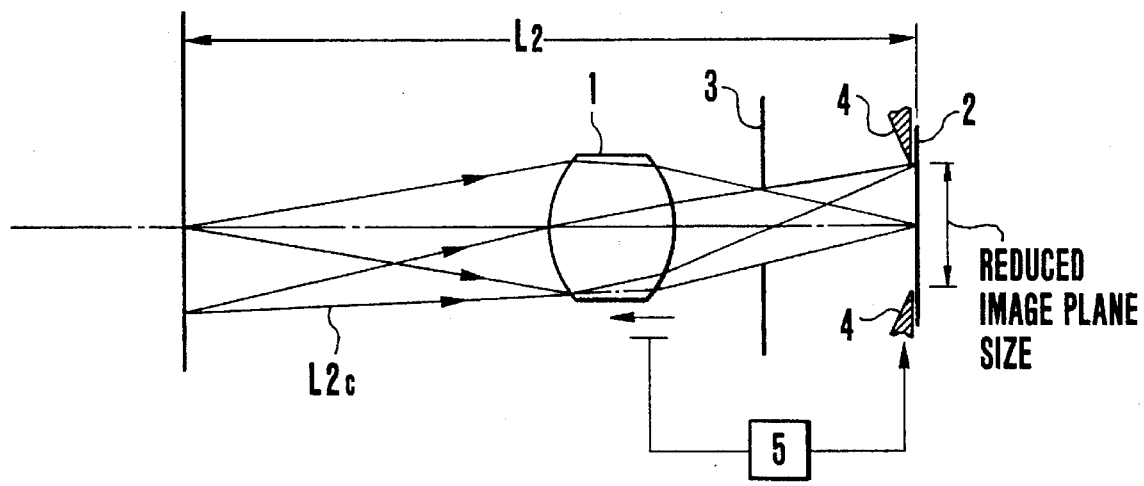

FIGS. 1A, 1B and 1C show a first embodiment of the invention. In the case of this embodiment, the nearest shootable object distance is arranged to be made shorter by moving (drawing out) the focusing part of the photo-taking lens to a greater extent when the image plane size is reduced (when the diagonal line D of the image plane is shortened) for a special shooting effect than when the image plane size is large.

In these figures, reference numeral 1 denotes a photo-taking lens. A focusing action is performed by moving the whole lens 1. A photosensitive surface 2 is made of, for example, a 35 mm silver-halide film. A diaphragm 3 is provided for controlling the amount of exposure. A mask 4 is provided for image plane size varying means 5 and is disposed in front of the photosensitive surface 2. The photo-taking lens 1 is normally composed of a plurality of lens elements. The casing of the camera is omitted from the illustration.

FIGS. 1A and 1B show the embodiment as having the image plane in its full size. In the case of FIG. 1A, the optical path is shown as in a state of having the photo-taking lens 1 focused on an object located at an infinity distance. FIG. 1B shows the optical path as in a state of having the photo-taking lens 1 focused on an object located at the nearest object distance L1. FIG. 1C shows the embodiment as having the image plane size on the photosensitive surface 2 reduced by the mask 4 of the image plane size varying means. In the case of FIG. 1C, the optical path is in a state of having the photo-taking lens 1 focused for an object distance L2 which is shorter than the object distance L1 as a result of drawing out the photo-taking lens 1 further forward on the object side than in the case of FIG. 1B. An adequate image is obtainable even with the photo-taking lens 1 drawn out further forward. The reason for this is as follows:

When the photo-taking lens 1 is focused on an infinity distance object as shown in FIG. 1A, a luminous flux L2a incident on a peripheral part 2a of the image plane passes the diaphragm 3 in a relatively large quantity even when the aperture of the diaphragm 3 is reduced to a small value.

When the photo-taking lens 1 is drawn out from its position of FIG. 1A to be focused on an object located at the object distance L1 as shown in FIG. 1B, a luminous flux L2b incident on the peripheral part 2a of the image plane is still allowed, in this instance, to pass the diaphragm 3 in a quantity sufficient for an exposure, although it is somewhat eclipsed by the photo-taking lens 1 and the diaphragm 3. In this instance, even if the diaphragm 3 is stopped down to a smaller aperture, some amount of luminous flux is still allowed to pass the diaphragm 3. Therefore, even if the diaphragm 3 is stopped down while focusing on an object located at the object distance L1, a luminous flux falls on the peripheral part 2a of the image plane to allow taking a shot of an object located at the nearest distance.

Figure 2:
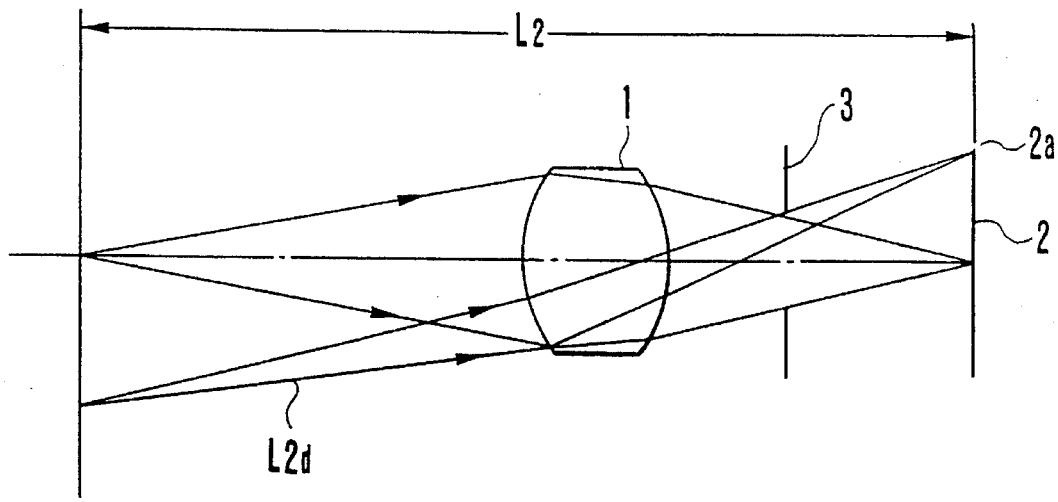
FIG. 2 shows an optical path for the nearest object distance of the conventional photo-taking lens.

In a case where the photo-taking lens 1 is drawn out further from its position shown in FIG. 1B to be focused on an object located at another object distance L2 which is shorter than the object distance L1, a luminous flux L2d incident on the peripheral part 2a of the image plane is allowed to pass the diaphragm 3, although only a slight amount of it is allowed to pass, when the diaphragm 3 is fully opened, as shown in FIG. 2. However, since the luminous flux L2d incident on the peripheral part 2a of the image plane does not pass the central part of the aperture of the diaphragm 3, the luminous flux L2d is totally eclipsed by the diaphragm 3 when the diaphragm 3 is stopped down, so that shooting becomes impossible.

On the contrary, in the event of a special shooting with the size of the image plane reduced, as shown in FIG. 1C, the shooting angle of view is decreased by the reduction in the image plane size. In that instance, therefore, a luminous flux incident on the peripheral part of the image plane is eclipsed at a lesser rate by the photo taking lens 1 and the diaphragm 3.

Even in the case of FIG. 2, for example, the reduction in size of the image plane as shown in FIG. 1C allows some amount of the luminous flux incident on the peripheral part 2a of the image plane to pass the diaphragm 3 even when the diaphragm 3 is stopped down.

This embodiment has such a mechanism that, when the image plane is set at a smaller size to utilize the above-stated optical property, the focusing part of the photo-taking lens can be moved to a greater extent by means of an interlocking mechanism than when the image plane is in a larger size. This arrangement effectively shortens the nearest shootable object distance. More specifically, a drawing-out mechanism for the photo-taking lens 1 is provided with an allowance part for increasing the maximum drawing-out extent of the photo-taking lens 1 in association with a change to the smaller image plane size effected by the image plane size varying means 5.

In a case where the camera has an automatic focusing mechanism, as will be described later, a control circuit is arranged to allow the lens drawing-out driving amount to exceed an amount allowable for the full size of the image plane when the image plane size is changed.

Further, in a case where this embodiment is applied to a video camera, the image plane size varying means is arranged to electrically vary the image pickup range of an image sensor.

Figure 3:
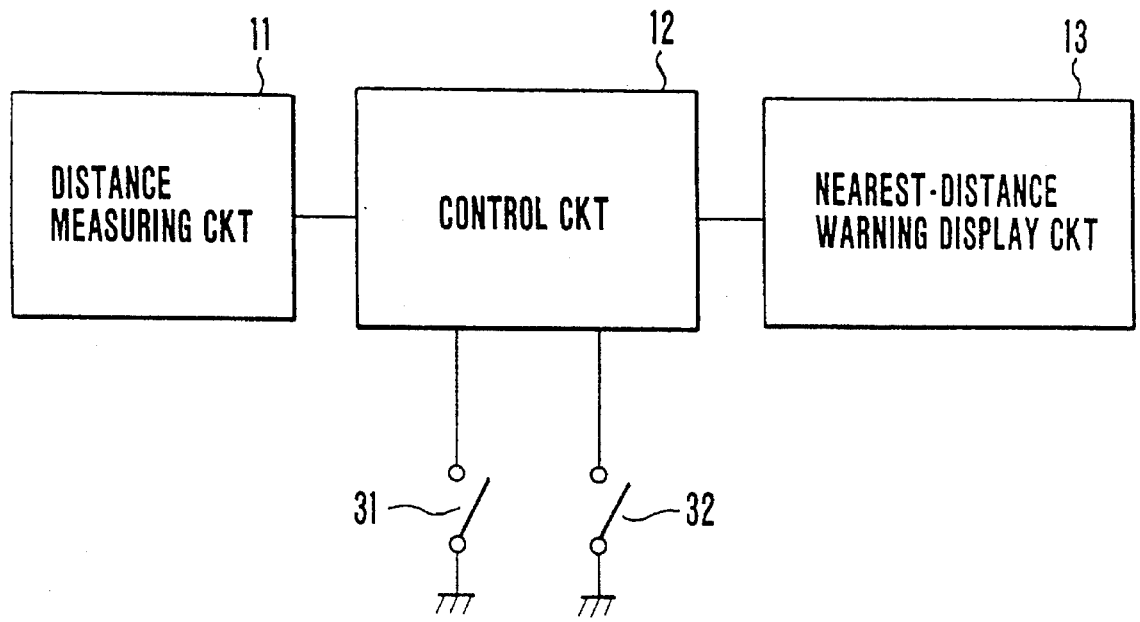
FIG. 3 is a block diagram showing the system arrangement of the first embodiment of the invention.

FIG. 3 shows the system arrangement of this embodiment. Referring to FIG. 3, a distance measuring circuit 11 operates as a part of a known automatic distance measuring means for measuring a distance L to an object. A control circuit 12 is a microcomputer or the like. The illustration includes a nearest-distance warning display circuit 13, a release switch 31 of the camera, and a switch 32 for setting a panorama mode.

Further, with respect to the automatic distance measuring means, devices of two different types are known. One is arranged to output the distance to the object as a signal, while the other is arranged to output the amount of defocus of an objective lens as a signal. Either of these devices can be employed as the automatic distance measuring means according to this invention.

Figure 4:
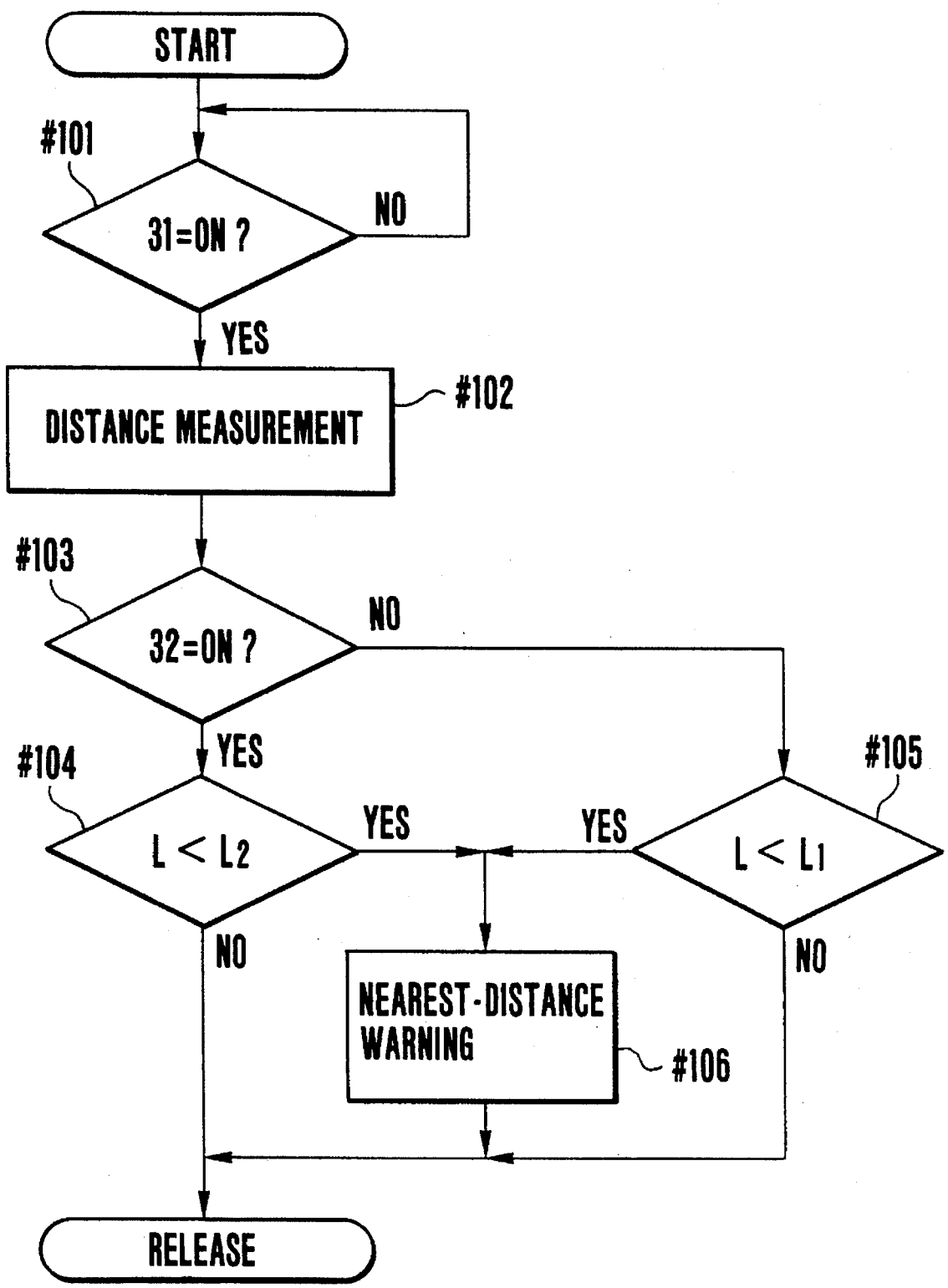
FIG. 4 is a flow chart showing the operation of the first embodiment of the invention.

Referring now to FIG. 4 which is a flow chart, the operation of this embodiment is described as follows:

At a step #101: A check is made to find if the release switch 31 is on. If so, the flow of operation comes to a step #102. At the step #102: A distance L to the object is measured by the distance measuring circuit 11. At a step #103: A check is made for a special shooting mode, such as a panorama mode. The switch 32 is off when the image plane is in its full size. Therefore, if the switch 32 is off, the flow comes to a step #105. At the step #105: The object distance L is compared with the nearest object distance L1 shootable for the full image plane size. If the distance L is found to be shorter than the distance L1, the flow comes to a step #106 to give a nearest-distance warning before the flow comes to a step for a release action.

In a case where the switch 32 is found to be on at the step #103 with the panorama mode selected, the flow comes to a step #104. At the step #104: The distance L is compared with the nearest distance L2 shootable for the panorama size of the image plane (L2<L1). If the distance L is found to be shorter than the distance L2, the flow comes to the step #106 to give the nearest-distance warning before the flow comes to the step for the release action.

As apparent from the foregoing, this embodiment is arranged to improve the optical specifications of the photo-taking lens by varying the nearest shootable distance when the image plane size is changed.

Figure 5C:
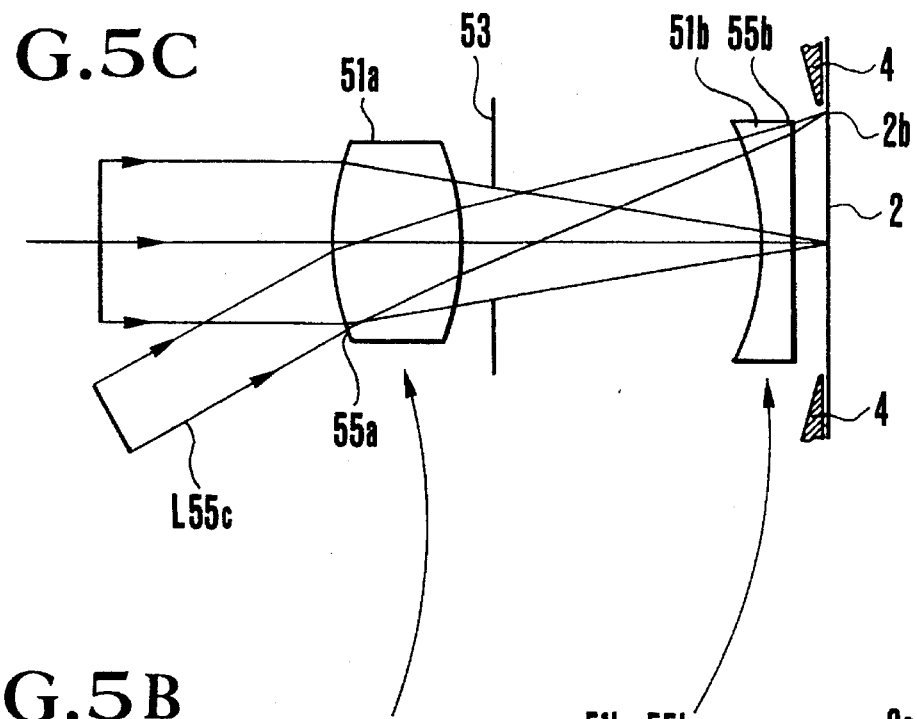
FIGS. 5A, 5B and 5C are sectional views of the optical system of a second embodiment of the invention.
Figure 5B:
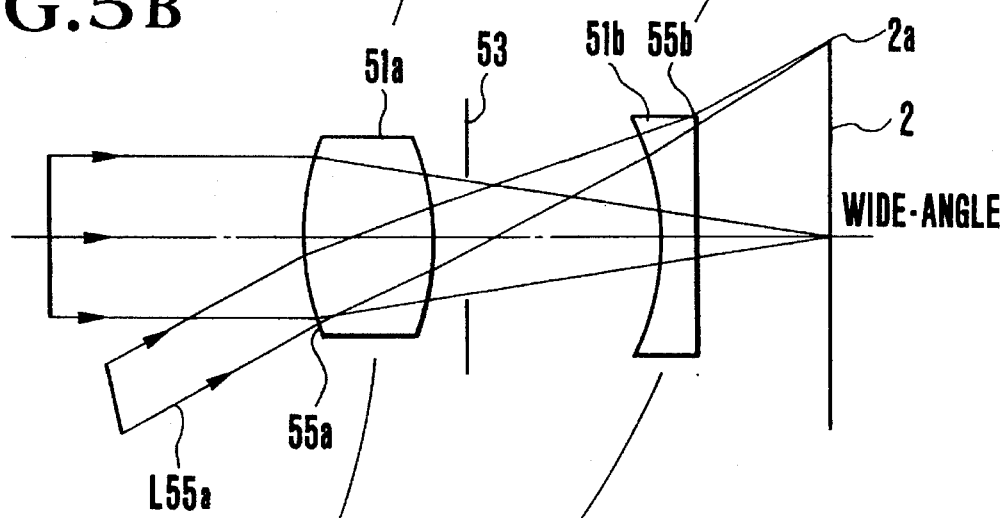
Figure 5A:
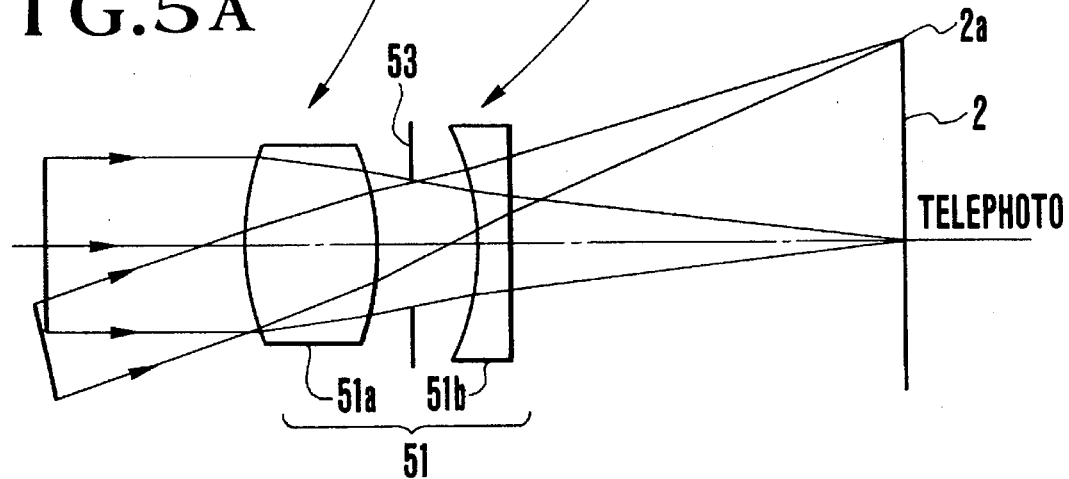

FIGS. 5A, 5B and 5C show the optical system of a second embodiment of the invention. A zoom lens is employed as the photo-taking lens in the second embodiment. When the image plane size is reduced, that is, when the diagonal length of the image plane is shortened, for the purpose of performing a special shooting, an ultra-wide angle of view can be obtained by moving the power varying part of the zoom lens to a greater extent along the optical axis for a power varying action than in the case of a larger image plane size, in such a way as to expand a shootable angle of view.

In these figures, reference numeral 51 denotes the photo-taking lens which is composed of a zoom lens and is arranged, for example, in a manner as disclosed in Japanese Laid-Open Patent Application No. SHO 57-201213. More specifically, the photo-taking lens 51 includes a first lens group 51a which is of a positive refractive power, and a second lens group 51b which is of a negative refractive power. The magnification (power) of the zoom lens is variable from a rate obtainable at a wide-angle end position to a rate obtainable at a telephoto end position and vice verse by differentially moving the two lens groups 51a and 51b toward the object (image surface).

The illustrations include a photosensitive surface 2 which is made of, for example, a 35 mm silver-halide film, a diaphragm 53, and a mask 4 for image plane size varying means. The mask 4 is disposed in front of the photosensitive surface 2.

FIGS. 5A and 5B show the image plane size of the photosensitive surface 2 as in a full size. In FIG. 5A, the optical path is shown with the zoom lens 51 in the telephoto end position. In FIG. 5B, the optical path is shown with the zoom lens 51 in the wide-angle end position. FIG. 5C shows a case wherein the image plane on the photosensitive surface 2 is reduced to a smaller size by the mask 4 for the image plane size varying means 4. In FIG. 5C, the optical path is shown as in a state of having a power varying action performed in an ultra-wide-angle end zoom position by moving the power varying part of the zoom lens 51 further on the wide-angle side than in the case of FIG. 5B.

In the wide-angle end zoom position as shown in FIG. 5B, a luminous flux L55a incident on the peripheral part 2a of the image plane is blocked by the edges of a lower part 55a of the first lens group 51a and an upper part 55b of the second lens group 51b. Referring to FIG. 5B, if the first lens group 51a and the second lens group 51b are moved further toward the image surface for varying the magnification for a wider angle of view, the luminous flux is almost totally eclipsed by the upper part 55b of the second lens group 51b to render shooting impossible. In other words, when the image plane is in its full size, the wide-angle end shown in FIG. 5B is the zoom position of the widest possible angle of view.

On the contrary, in a case where a special shooting is to be performed with the image plane size reduced as shown in FIG. 5C, the reduction in size of the image plane enables the luminous flux which is incident on the peripheral part 2b of the image plane and is eclipsed by the second lens group 51b in the case of FIG. 5B to pass through the lens group 51b without being eclipsed. In other words, with the image plane size reduced as shown in FIG. 5C, the luminous flux L55c incident on the peripheral part 2b of the image plane is allowed to pass through without being eclipsed by the upper part 55b of the lens group 51b even when the lens group 51b is moved further toward the image surface from its position shown in FIG. 5B.

By utilizing this optical property, the second embodiment is arranged to be capable of moving the power varying part of the photo-taking lens (zoom lens) by an interlocking mechanism to a further extent on the wide-angle side when the image plane is in a smaller size than when the image plane is in a larger size. The zooming range is thus expanded on the wide-angle side for an ultra-wide angle of view. In other words, when the image plane size is reduced by the image plane size varying means, the maximum movable amount of the power varying part of the photo-taking lens 51 is increased in response to the action of the image plane size varying means. In a case where, for example, a panoramic effect is to be attained in the special shooting mode, the image plane is laterally expanded for a wider angle of view.

In the panorama mode, the image plane which is in the full size of the 35 mm film is vertically blocked in part from light on the upper and lower sides of the image plane. Therefore, the size of the image plane in the lateral direction thereof remains almost completely unchanged. With the angle of view widened in the panorama mode, therefore, the angle of view is widened in the lateral direction to further the panoramic effect. This effect is attainable not only from use of the zoom lens of the type shown in FIGS. 5A, 5B and 5C but also from a zoom lens of the ordinary four group type or the like.

FIG. 6 shows the system arrangement of this embodiment. Referring to FIG. 6, a control circuit 61 includes a microcomputer or the like. A zoom motor driving circuit 62 is arranged to drive and control a motor 63. The motor 63 is arranged to drive the lens groups 51a and 51b of a power varying part in a known manner. Focal length detecting means 64 is arranged to detect a focal length of the whole system (a zoom position) obtained by the magnification (power) varying action of the power varying part. The control circuit 61 is provided with switches S1, S2 and S3.

The switch S1 is arranged to be turned on in setting the embodiment in a special shooting mode, such as a panorama mode. The switch S2 is arranged to be turned on in shifting the power varying part, for example, toward a telephoto end position. The switch S3 is arranged to be turned on, for example, in shifting the power varying part toward a wide-angle end position.

This embodiment is arranged to have a normal image plane size (or a full image plane size) when the switch S1 is in an off-state. With the image plane in the normal (full) size, the focal length detecting means 64 detects a magnification (power) varying range when either the switch S2 or the switch S3 is turned on. The power varying action is performed, with the image plane in the normal size, by causing the zoom motor driving circuit 62 to drive the motor 63 within the normal power varying range up to a telephoto end or wide-angle end position.

When the switch S1 is in an on-state to have the embodiment in the panorama mode in which the image plane is changed from its normal size, the lens is driven toward the wide-angle end position if the switch S3 continues to be in the on-state. Therefore, in that instance, the control circuit 61 detects from the focal length detecting means 64 the wide-angle end zoom position for the full size image plane and, after that, causes the power varying part to be driven from the wide-angle end zoom position detected further toward a wider angle position. In other words, the power varying part is driven toward a wider angle position by the zoom motor driving circuit 62 and the motor 63 to perform its power varying action for an ultra-wide-angle end position set for the panorama mode.

Further, in a case where the switch S2 turns on with the switch S1 in its on-state, telephoto driving takes place. In that instance, the power varying action is performed up to the normal telephoto end position like when the switch S1 is in its off-state.

In the second embodiment described above, in attaining various special shooting effects by varying the image plane size on the photosensitive surface, such improvements in optical specifications that have been difficult to attain for the photo-taking lens with the image plane in the larger size, such as shortening the nearest shootable object distance, expanding the shooting angle of view to a wider angle (for an ultra-wide angle), in a case where the photo-taking lens is a zoom lens, are attainable with the applicable component elements set as described above. Therefore, in accordance with the arrangement of the embodiment, the camera can be provided with image plane size varying means which permits the above-stated improvements in optical specifications.

Next, the optical states of the zoom lens shown in FIGS. 5A, 5B and 5C are described with mathematical expressions as follows:

Assuming that the longest length of the diagonal line of the image plane (a normal image plane) is D, the length of the diagonal line of an image plane reduced by the image plane size varying means is d, the normal shortest focal length of the photo-taking lens obtained when the diagonal length of the image plane is D is F and the focal length of the photo-taking lens obtained when the diagonal length of the image plane is d is f, there are obtained the following relations:

$$\left. \begin{array}{l} D/2 = F \cdot \tan \theta 1 \\ d/2 = f \cdot \tan \theta 2 \end{array} \right\} \quad (1)$$

wherein θ1 represents an angle of view obtained when the diagonal length of the image plane is D, and θ2 represents an angle of view obtained when the diagonal length of the image plane is d.

No conspicuous wide-angle shooting effect is attainable even if the image plane size is changed, if the rate of change in the diagonal length "d/D" and the rate of expansion of the shootable range (the rate of change in focal length on the wide-angle side) "f/F" are equal to each other. Further, if the rate of change in the diagonal length of the image plane "d/D" is smaller than the rate of expansion of the shootable range "f/F", it is more impossible to attain the wide-angle shooting effect. In such a case, therefore, it is meaningless to change the size of the image plane.

In order to attain a conspicuous wide-angle shooting effect by making the image plane size smaller than the normal size, the angle of view θ2 must be larger than the angle of view θ1. Hence, from the formula (1), a condition for attaining any conspicuous wide-angle shooting effect can be expressed as follows:

$$\tan \theta 1 < \tan \theta 2 \quad (2)$$

The following formula is derivable from the above-stated formulas (1) and (2):

$$\tan \theta 1 = \frac{D}{2F} , \tan \theta 2 = \frac{d}{2f} \quad (3)$$

therefore, $\frac{d}{D} > \frac{f}{F}$

It is, therefore, necessary to satisfy the formula (3) for attaining any conspicuous wide-angle shooting effect when changing the size of the image plane.

When the size of the image plane is changed, the image plane size varying means and the power varying means of the photo-taking optical system of the embodiment are controlled in association with each other in such a way as to satisfy the formula (3). In addition to this, in shooting with the image plane size changed (reduced), the power varying optical system of the embodiment is brought into an ultra-wide angle position where a wider angle than a normally maximum wide angle is obtained for attaining more conspicuous wide-angle effect than the conventional camera, so that a conspicuous wide-angle shooting effect which is hardly attainable with the conventional panorama shooting type camera can be attained.

Figure 7A:
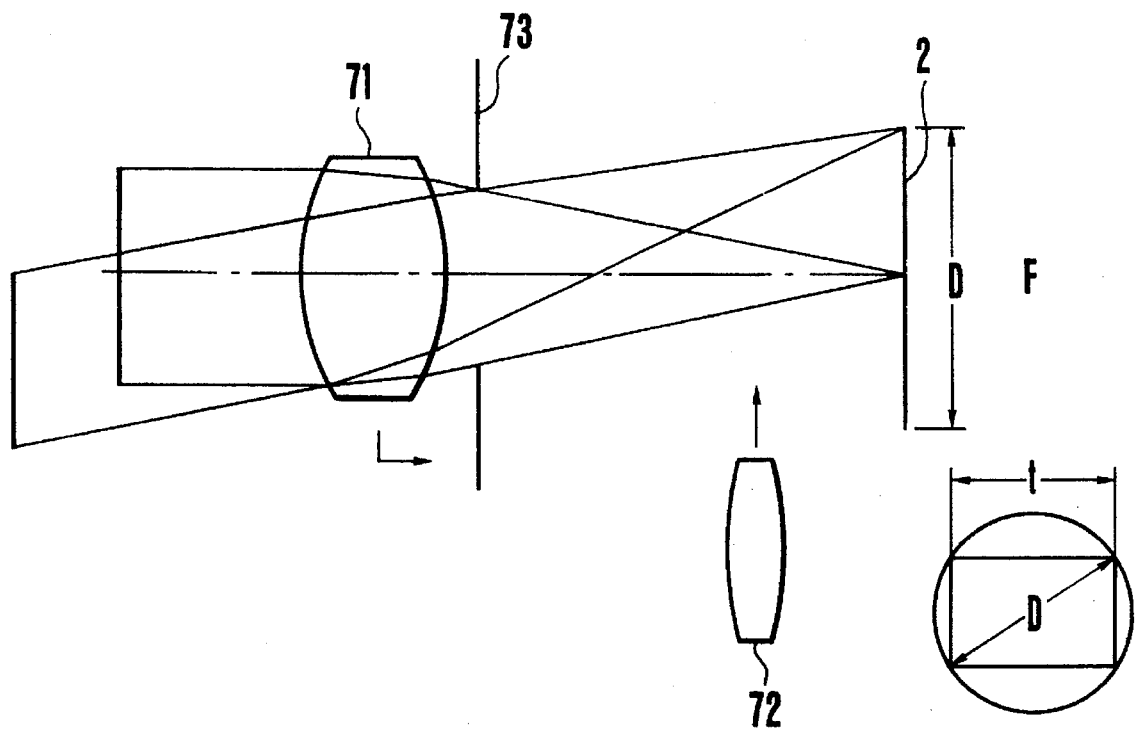
FIGS. 7A and 7B are sectional views showing the optical system of a third embodiment of the invention.
Figure 7B:
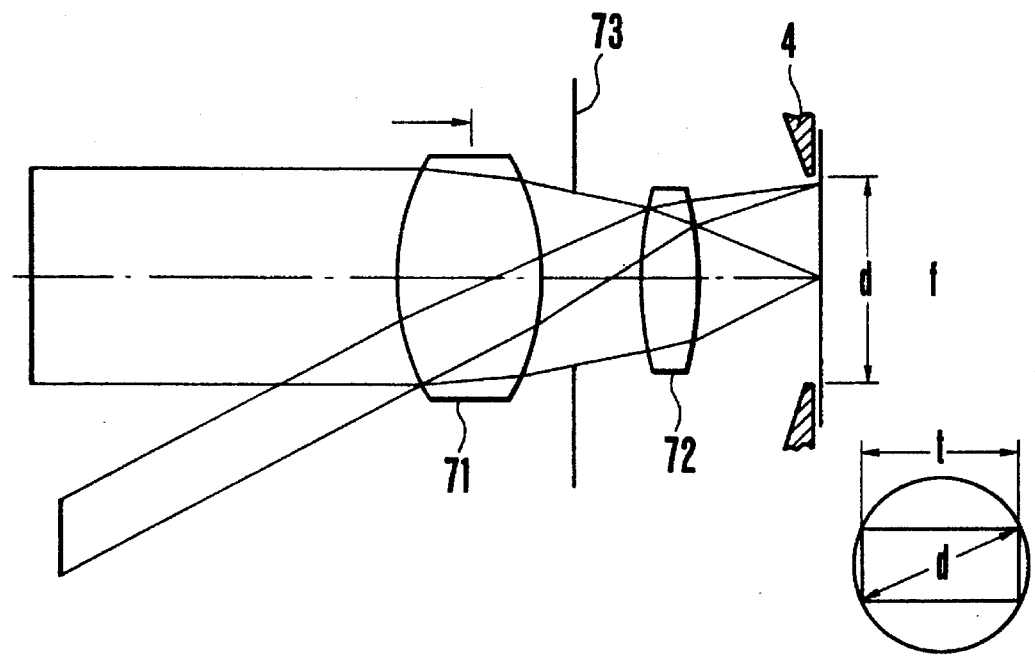

With respect to the arrangement for shifting the photo-taking optical system from the normally maximum wide-angle position further to the ultra-wide angle position, the optical system may be arranged to include an auxiliary lens 72 which is arranged, separately from a photo-taking lens 71 as shown in FIGS. 7A and 7B, to be inserted into the optical axis of the photo-taking lens 71.

FIG. 7A shows the auxiliary lens 72 as in its normal position in which a normally maximum wide-angle state is obtained with the auxiliary lens 72 not inserted in the optical axis in the rear of the photo-taking lens 71. In this case, the diagonal length of the image plane is at its maximum value D. In the case of FIG. 7B, the diagonal length of the image plane is shortened to a value d by the mask 4 of the image plane size varying means. In that case, the auxiliary lens 72 is inserted in the rear of the photo-taking lens 71 in response to the change in the image plane size, and the photo-taking lens 71 is set in its maximum wide-angle position.

Figure 8A:
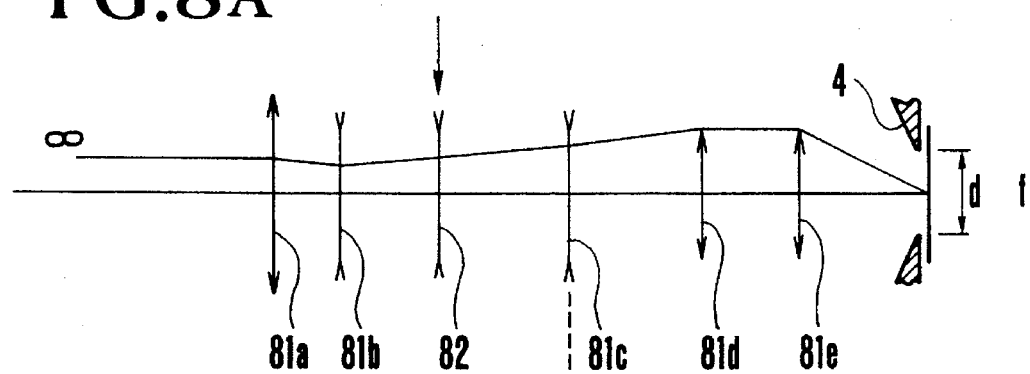
FIGS. 8A to 8D show the layout of the optical system of a fourth embodiment of the invention as a thin-lens system.
Figure 8B:
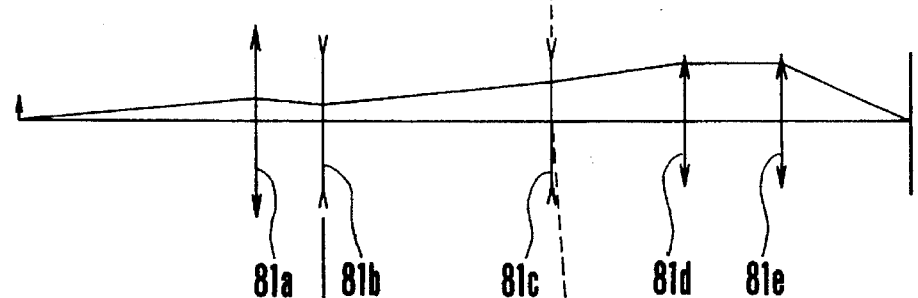
Figure 8C:
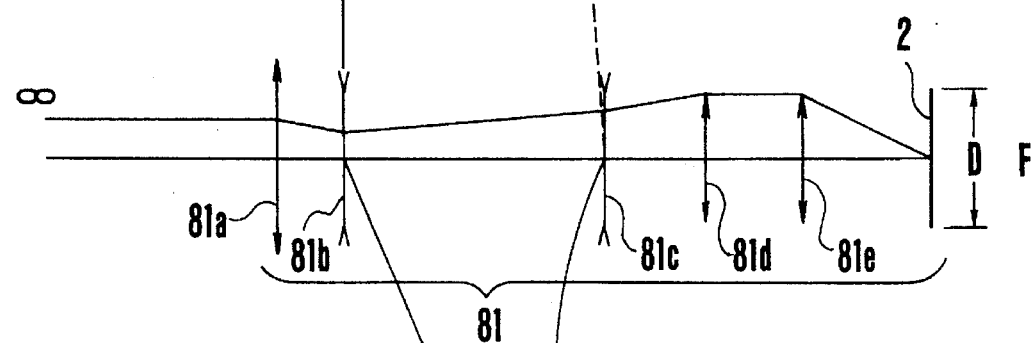
Figure 8D:
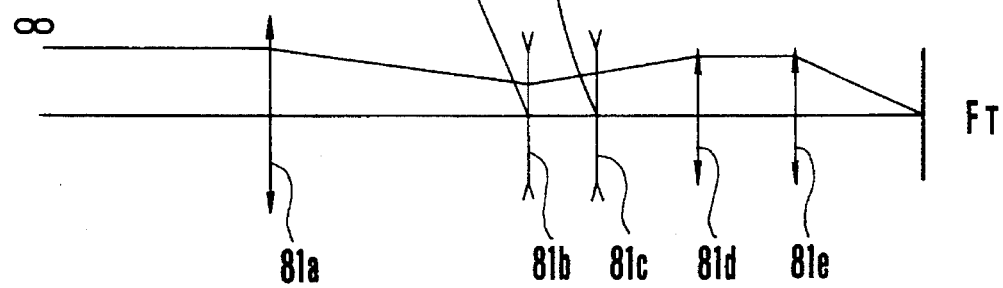

FIGS. 8A to 8D show another example of the optical system arrangement. In this instance, an auxiliary lens 82 which has a negative refractive power is arranged to be insertable into the optical axis of a main optical system. The zoom lens of the main optical system includes a first lens group 81a (focusing lens) which has a positive refractive power, a second lens group 81b (variator lens) which has a negative refractive power, a third lens group 81c (image surface compensation lens) which has a negative refractive power, a fourth lens group 81d which has a positive refractive power, and a fifth lens group 81e which has a positive refractive power. A zooming action is performed by differentially moving the second lens group 81b and the third lens group 81c as shown in FIGS. 8C and 8D. Macro-shooting is possible by slightly moving the third lens group 81c with the second lens group 81b fixed at the wide-angle end of zooming.

In the macro-shooting mode, as shown in FIG. 8B, with the third lens group 81c moved toward the object at the wide-angle end of the zoom lens which is arranged as described above, the auxiliary lens 82 is inserted in between the second lens group 81b and the third lens group 81c to correct the shooting distance to the normal shooting distance (based on infinity distance), and the diagonal length of the image plane is shortened to the length d by means of the mask 4 of the image plane size varying means, as shown in FIG. 8A.

Figure 9A:
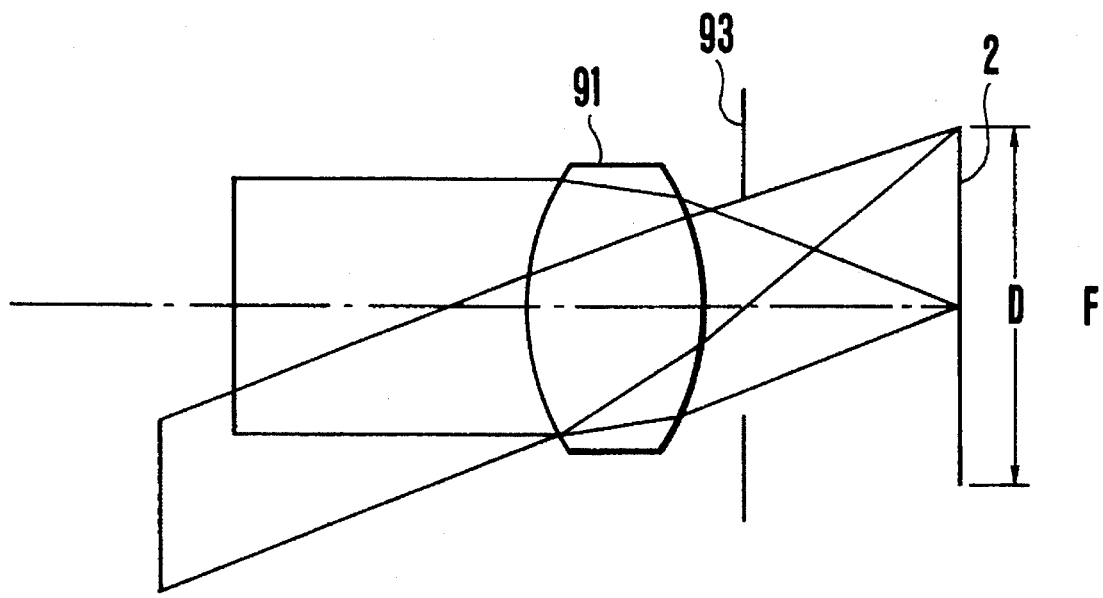
FIGS. 9A and 9B are sectional views showing the optical system of a fifth embodiment of the invention.
Figure 9B:
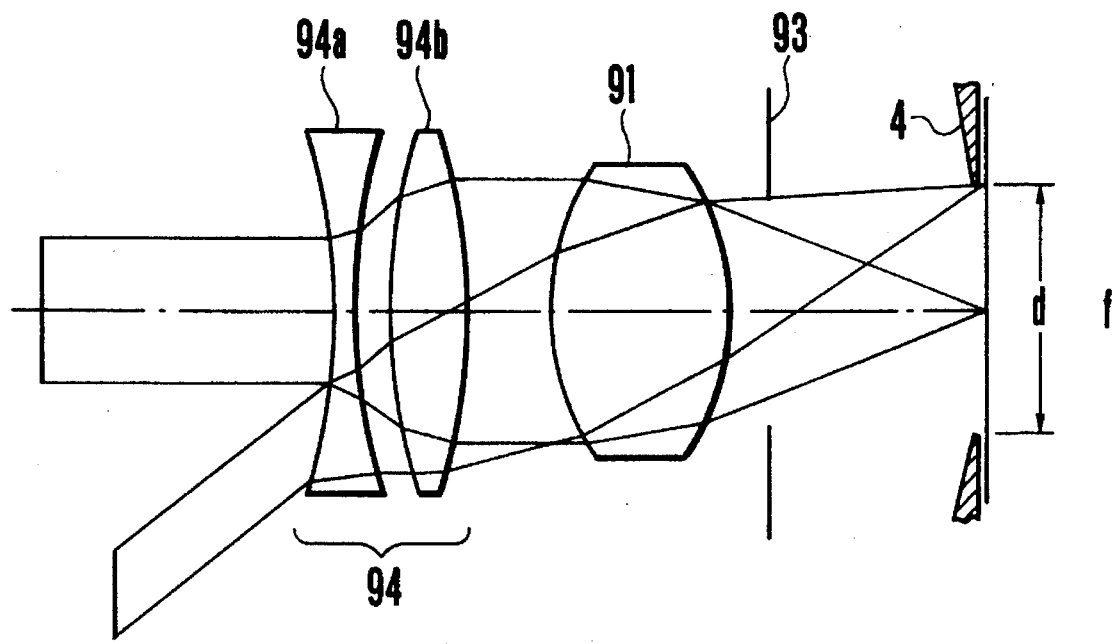

FIGS. 9A and 9B show a further example of the optical system arrangement. In this case, an auxiliary lens 94 is inserted into a main optical system (image forming optical system). Referring to FIG. 9B, the auxiliary lens 94 is an afocal wide-angle converter lens. The auxiliary lens 94 includes a front lens group 94a which has a negative refractive power and a rear lens group 94b which has a positive refractive power. The main optical system, i.e., the image forming optical system, consists of a monofocal lens 91. When the image plane is in a standard (normal) size having the diagonal length D, the monofocal lens 91 of the image forming optical system has the focal length F. When the image plane size is changed to change the diagonal length from the length D to the length d which is shorter than the length D, the afocal wide-angle converter lens 94 which is the auxiliary lens is inserted in the optical axis in front of the monofocal lens 91.

Figure 10:
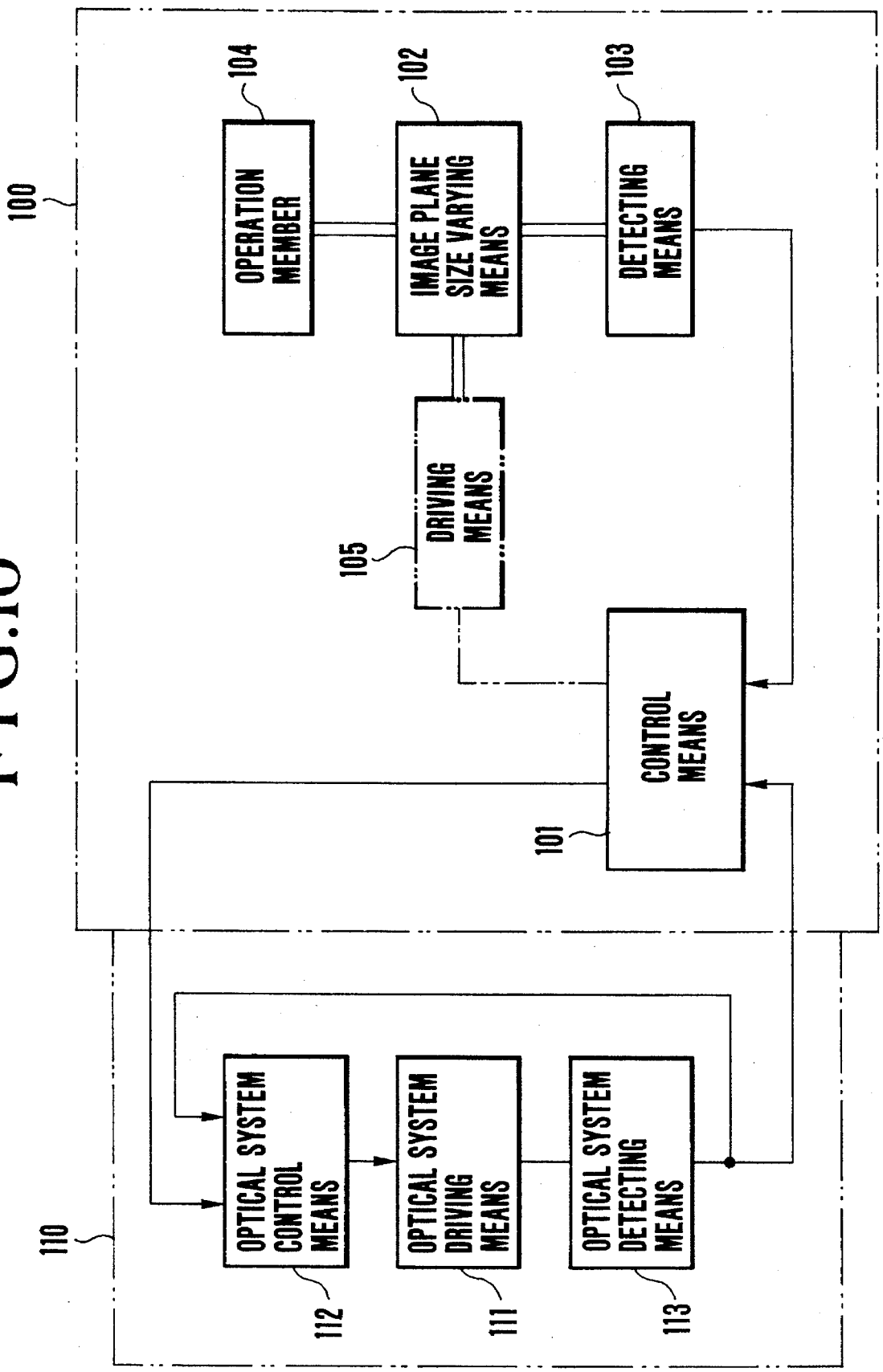
FIG. 10 is a block diagram showing the system arrangement of another embodiment of the invention.

FIG. 10 is a block diagram showing the control system arrangement of an interchangeable-lens type camera to which this invention is applied.

Referring to FIG. 10, the illustration includes a camera body 100, an interchangeable lens 110 which is detachably mounted on the camera body 110, control means 101 which includes a microcomputer or the like, image plane size varying means 102, detecting means 103 for detecting the state of the image plane size varying means 102 obtained at any arbitrary point of time, an operation member 104 which is arranged to be manually operated by the operator for changing the image plane size, and driving means 105 connected to the image plane size varying means 102. This driving means 105 is employed only in a case where the image plane size varying means 102 is a mechanical means. If the image plane size varying means 102 is composed of a liquid crystal, the image plane size varying means 102 is controlled directly by the control means 101. Optical system driving means 111 is arranged to drive a power varying optical system and an image forming optical system. Optical system control means 112 is arranged to control the optical system driving means 111. Optical system detecting means 113 is arranged to detect the positions of the power varying optical system and the image forming optical systems.

With the camera arranged as described above according to this invention, when the operator of the camera operates the operation member 104 to cause the size of the image plane to be varied by the image plane size varying means 102, the image plane varying state is detected by the detecting means 103. The detecting means 103 then outputs a detection signal. The detection signal is taken in by the control means 101. The control means 101 causes the optical system control means 112 to have the lens of the power varying optical system driven by the optical system driving means 111 in such a way as to satisfy the above-stated formula "d/D>f/F". When the position of the power varying optical system and that of the image forming optical system are detected by the detecting means 113, the output of the detecting means 113 is fed back to the optical system control means 112. Then, the power varying optical system and the image forming optical system are controlled accordingly.

In a case where the lens of the power varying optical system is shifted from the normally maximum wide-angle position further to an ultra-wide angle position without varying the size of the image plane by the image plane size varying means 102, this change in position is detected by the optical system detecting means 113. The control means 101 then obtains the detection output of the detecting means 113. Upon receipt of the detection output, the control means 101 causes the driving means 105 to drive the image plane size varying means 102 in such a way as to satisfy the above-stated formula.

Further, while the foregoing description of embodiments relates only to cameras, it goes without saying that this invention is applicable also to other optical apparatuses such as observation equipments, projectors and so on. Further, while each of the lenses which is shown as a single lens in the accompanying drawings for the sake of illustration actually consists of a plurality of lens elements in many cases.

What is claimed is:

1. A camera comprising:

a) varying means for varying an image pickup area from a first size to a second size, the second size having a shorter diagonal length than a diagonal length of the first size; and b) objective lens means for varying a focusable minimum object distance when the image pickup area changes from the first size to the second size, said objective lens means having a shorter minimum object distance at the second size than at the first size.

2. A camera according to claim 1, further comprising automatic distance detecting means arranged to output a detection value, and wherein said objective lens means comprises means for allowing said objective lens means to be focused on an object located at a distance closer than a minimum value of a focusable range set for the first size, according to the detection value, when said varying means varies the image pickup area to the second size.

3. An optical apparatus comprising:

a) image forming optical means for forming an image, said image forming optical means having a magnification that is variable from a first state to a wide angle state;

b) image plane size varying means for varying a size of an image plane; and c) control means for controlling said image forming optical means to allow shifting of said image forming optical means from the wide angle state to a wider angle state in association with a change of the size of the image plane, wherein, when "D" is a maximum diagonal length of the image plane, "d" is a diagonal length of the image plane shortened by the change of the size of the image plane, "F" is a shortest focal length of said image forming optical means normally obtainable when the image plane has the maximum diagonal length and "f" is the shortest focal length of said image forming optical means obtainable when the diagonal length of the image plane becomes d, said control means controls shifting of said image forming optical means to the wider angle state so that the following relation is satisfied: d/D>f/F.

4. An apparatus according to claim 3, wherein said image forming optical means comprises a lens unit that is movable in the direction of an optical axis to vary the magnification of said image forming optical means.

5. An apparatus according to claim 3, wherein said image forming optical means comprises an auxiliary lens that is insertable into an optical path of said image forming optical means to vary the magnification of said image forming optical means.

6. An apparatus according to claim 3, wherein said image forming optical means comprises a lens unit that is movable in the direction of an optical axis to vary the magnification of said image forming optical means and an auxiliary lens that is insertable into an optical path of said image forming optical means to place said image forming optical means in a wider angle state.

7. A camera comprising:
   a) varying means for varying an image pickup area from a first size to a second size, the second size having a shorter diagonal length than a diagonal length of the first size; and
   b) objective lens means for varying zooming range when the image pickup area changes from the first size to the second size, said objective lens means having a broader zooming range at the second size than at the first size.

8. A camera according to claim 7, wherein said objective lens means has a zooming range expanding to the wide angle side of view at the second size.

* * * * *

UNITED STATES PATENT AND TRADEMARK OFFICE
CERTIFICATE OF CORRECTION

PATENT NO. : 5,574,523
DATED : November 12, 1996
INVENTOR(S) : HIROKI NAKAYAMA, ET AL.

It is certified that error appears in the above-indentified patent and that said Letters Patent is hereby corrected as shown below:

COLUMN 1

Line 14, "camera" should read --camera,--. (3rd Occurrence)

COLUMN 5

Line 36, "vice verse" should read --vice versa--.

UNITED STATES PATENT AND TRADEMARK OFFICE
CERTIFICATE OF CORRECTION

PATENT NO. : 5,574,523

DATED : November 12, 1996

INVENTOR(S) : HIROKI NAKAYAMA, ET AL.

It is certified that error appears in the above-indentified patent and that said Letters Patent is hereby corrected as shown below:

<u>COLUMN 7</u>

Line 59, delete "more".

<u>COLUMN 10</u>

Line 10, delete "while".

Signed and Sealed this

Twenty-fourth Day of June, 1997

Attest:

BRUCE LEHMAN

*Attesting Officer*   *Commissioner of Patents and Trademarks*